US012642404B2

(12) United States Patent (10) Patent No.: US 12,642,404 B2
Sjöberg et al. (45) Date of Patent: Jun. 2, 2026

(54) VALVE ARRANGEMENT FOR AN INDUSTRIAL DUST EXTRACTOR

(71) Applicant: HUSQVARNA AB, Huskvarna (SE)

(72) Inventors: Axel Sjöberg, Västra Frölunda (SE);
Karl Elmestrand, Sävedalan (SE);
Jonas Eriksson, Knivsta (SE)

(73) Assignee: HUSQVARNA AB, Huskvarna (SE)

( * ) Notice: Subject to any disclaimer, the term of this
patent is extended or adjusted under 35
U.S.C. 154(b) by 841 days.

(21) Appl. No.: 17/924,718

(22) PCT Filed: Jun. 4, 2021

(86) PCT No.: PCT/SE2021/050534
§ 371 (c)(1),
(2) Date: Nov. 11, 2022

(87) PCT Pub. No.: WO2021/251873
PCT Pub. Date: Dec. 16, 2021

(65) Prior Publication Data
US 2023/0182062 A1 Jun. 15, 2023

(30) Foreign Application Priority Data

Jun. 11, 2020 (SE) .................................... 2050697-8
Jul. 9, 2020 (SE) .................................... 2050865-1
(Continued)

(51) Int. Cl.
*B01D 46/71* (2022.01)
*A47L 7/00* (2006.01)
(Continued)

(52) U.S. Cl.
CPC ........... *A47L 9/1675* (2013.01); *A47L 7/0095*
(2013.01); *A47L 9/127* (2013.01); *A47L*
*9/1418* (2013.01);
(Continued)

(58) Field of Classification Search
CPC ...... A47L 9/1675; A47L 7/0095; A47L 9/127;
A47L 9/1418; A47L 9/1683;
(Continued)

(56) References Cited

U.S. PATENT DOCUMENTS 3,850,200 A 11/1974 Flebu
4,277,265 A 7/1981 Leinfelt
(Continued)

FOREIGN PATENT DOCUMENTS

AU 2008234975 B2 3/2011
CN 110603399 A 12/2019
(Continued)

OTHER PUBLICATIONS

International Search Report and Written Opinion for International
Application No. PCT/SE2021/050534 mailed Jul. 1, 2021.

*Primary Examiner* — Dung H Bui
(74) *Attorney, Agent, or Firm* — Burr & Forman

(57) ABSTRACT

A valve arrangement (900) for generating a pulse of air
(1100) to clean an air filter (125) of a pre-separator (120), the
arrangement (900) comprising: a main valve closure body
(950) arranged to seal a passage (951) between a high
pressure (P2) side and a low pressure (P3) side of the valve
arrangement (900), a control body (940), connected to the
main valve closure body (950), such that a position of the
main valve closure body (950) Is determined by a position
of the control body (940), a control chamber (930), partially
defined by the control body (940), whereby a volume of the
control chamber (930) Is variable In relation to the position
of the control body (940), and a control chamber valve (920)
having an open state and a closed state for regulating a
pressure (P1) In the control chamber, wherein the control
chamber (930) Is fluidly connected to the low pressure (P3)
side via a connecting channel (935) configured with a
connecting channel aperture (936), wherein the control (Continued)

chamber valve (920) Is configured with an aperture larger than the connecting channel aperture (936) such that the control chamber valve (920) Is arranged to overcome the connecting channel (935), and wherein the state of the control chamber valve (920) Is determined by a trigger device (910, 980). The arrangement also comprises a resilient trigger membrane (980) arranged between the high-pressure (P2) side and the low pressure (P3) side wherein the state of the control chamber valve (920) is determined by the position of the resilient trigger membrane (980).

17 Claims, 10 Drawing Sheets

(30)     Foreign Application Priority Data

| | | |
|---|---|---|
| Jul. 9, 2020 | (SE) | 2050866-9 |
| Jul. 9, 2020 | (SE) | 2050867-7 |
| Aug. 26, 2020 | (SE) | 2050985-7 |
| Oct. 1, 2020 | (SE) | 2051148-1 |

(51)  Int. Cl.

| | |
|---|---|
| *A47L 9/12* | (2006.01) |
| *A47L 9/14* | (2006.01) |
| *A47L 9/16* | (2006.01) |
| *A47L 9/20* | (2006.01) |
| *B01D 46/42* | (2006.01) |
| *B01D 50/20* | (2022.01) |
| *A47L 9/00* | (2006.01) |

(52)  U.S. Cl.
CPC .......... *A47L 9/1683* (2013.01); *A47L 9/1691* (2013.01); *A47L 9/20* (2013.01); *B01D 46/4272* (2013.01); *B01D 46/71* (2022.01); *B01D 50/20* (2022.01); *A47L 9/009* (2013.01)

(58)  Field of Classification Search
CPC .......... A47L 9/1691; A47L 9/20; A47L 9/009; A47L 9/1427; A47L 9/1481; A47L 9/1436; B01D 46/4272; B01D 46/02; B01D 46/10; B01D 46/12; B01D 46/71; B01D 50/20; Y02A 50/2351
See application file for complete search history.

(56)     References Cited

U.S. PATENT DOCUMENTS

| | | | | |
|---|---|---|---|---|
| 4,504,293 | A | * 3/1985 | Gillingham | B01D 46/71 |
| | | | | 55/504 |
| 5,533,706 | A | 7/1996 | Aurell | |
| 5,951,746 | A | 9/1999 | Treitz et al. | |
| 6,073,905 | A | 6/2000 | Wilson | |
| 9,186,612 | B2 * | 11/2015 | Wahlquist | B01D 46/0045 |
| 2009/0000485 | A1 | 1/2009 | Valentini | |
| 2012/0137467 | A1 | 6/2012 | Treitz | |
| 2013/0263406 | A1 | 10/2013 | Amisani et al. | |
| 2014/0237763 | A1 | 8/2014 | Holsten et al. | |
| 2016/0150932 | A1 | 6/2016 | Foenss | |
| 2017/0001136 | A1 | 1/2017 | Hensel et al. | |
| 2017/0291130 | A1 | 10/2017 | Krogsgaard | |
| 2019/0014963 | A1 | 1/2019 | Barabeisch et al. | |
| 2023/0182062 | A1 * | 6/2023 | Sjöberg | A47L 9/1675 |
| | | | | 55/302 |

FOREIGN PATENT DOCUMENTS

| | | | |
|---|---|---|---|
| DE | 102010045979 | A1 | 3/2012 |
| DE | 102015113189 | A1 | 2/2017 |
| EP | 955003 | A1 | 11/1999 |
| EP | 1340446 | A1 | 9/2003 |
| EP | 1656872 | A3 | 5/2007 |
| EP | 2721985 | B1 | 5/2016 |
| EP | 3146881 | A1 | 3/2017 |
| EP | 3334319 | B1 | 9/2020 |
| EP | 3240619 | B1 | 12/2020 |
| GB | 1149012 | A | 4/1969 |
| WO | 2011150957 | A1 | 12/2011 |
| WO | 2011151219 | A1 | 12/2011 |
| WO | 2012130806 | A1 | 10/2012 |
| WO | 2017025305 | A1 | 2/2017 |
| WO | 2017/171596 | A1 | 10/2017 |
| WO | 2018202670 | A1 | 11/2018 |

* cited by examiner

FIG. 2B                 FIG. 2C

VALVE ARRANGEMENT FOR AN INDUSTRIAL DUST EXTRACTOR

TECHNICAL FIELD

The present disclosure relates to dust extraction devices for use with construction equipment. There are disclosed hatches for dumping dust accumulated in a pre-separator such as a cyclone device into a dust container. There are also disclosed arrangements for cleaning pre-separator air filters and other air filters.

BACKGROUND

Dust and slurry are created by cutting, drilling, grinding and/or demolishing concrete, brick, and other hard construction materials. The dust and slurry may be collected by a dust extractor and removed from the construction site in a controlled manner. Dust extractors collect the dust and slurry by generating a vacuum by means of an impeller and motor arrangement, i.e., similar to a vacuum cleaner for domestic use. Many industrial grade dust extractors comprise a pre-separator or cyclone device followed by an essential filter such as a high-efficiency particulate air (HEPA) filter.

During operation, dust gradually accumulates inside the pre-separator chamber and needs to be emptied regularly into a dust container such as a disposable bag or other type of dust container. One example of a disposable dust container is the Longopac® bagging system discussed, e.g., in US 2018/0192838.

A hatch mechanism separates the pre-separator chamber from the dust container. Several hatch mechanisms are known, such as hinged metal hatches, but such hatches have been known to damage and even puncture dust container bags and may not always be able to efficiently empty accumulated dust and slurry into the dust container. WO 2017/171596 discusses a type of hatch mechanism based on an aperture with a grid or net in combination with a hose device made of a flexible material. This hatch mechanism is less likely to damage dust container bags.

Some forms of dust, such as fine concrete dust, tends to clot and lump when accumulated at the bottom of the pre-separator. It may be difficult to efficiently empty such accumulated dust from the pre-separator. The design proposed in WO 2017/171596 may not always provide optimal emptying performance. Thus, there is a need for improved pre-separator hatch mechanisms for industrial grade dust extractors.

The pre-separator or cyclone normally comprises an air filter which gradually becomes particle-laden, i.e., clogged, during operation. This filter therefore needs to be cleaned regularly. It is known to clean the air filter in the pre-separator by means of a relief valve to generate a reverse thrust of air, or air pulse, as discussed in, e.g., WO 2017/171596, WO 2017/025305, and EP3619453. However, the design of a relief valve which generates this reverse thrust of air is not straight forward. There is a need for improved valve arrangements for generating such pulses of air which allow efficient filter cleaning in a convenient manner.

SUMMARY

It is an object of the present disclosure to provide valve arrangements for industrial grade dust extractors which alleviate at least some of the above-mentioned issues.

This object is obtained by a valve arrangement for generating a pulse of air to clean an air filter of a pre-separator. The arrangement comprises a main valve closure body arranged to seal a passage between a high pressure side and a low pressure side of the valve arrangement, a control body connected to the main valve closure body, such that a position of the main valve closure body is determined by a position of the control body, a control chamber partially defined by the control body, whereby a volume of the control chamber is variable in relation to the position of the control body, and a control chamber valve having an open state and a closed state for regulating a pressure in the control chamber. The control chamber is fluidly connected to the low pressure side via a connecting channel configured with a connecting channel aperture and the control chamber valve is configured with an aperture larger than the connecting channel aperture such that the control chamber valve is arranged to overcome the connecting channel when in the open state. The state of the control chamber valve is determined by a trigger device.

Thus, a robust and simple mechanism is provided for generating a pulse of air to clean an air filter of a pre-separator. The arrangement does not require complex three-way valves or the like, which is an advantage. The arrangement provides a trigger mechanism able to generate an abrupt opening of the main valve closure body to generate a distinct air pulse.

According to some aspects, the trigger device comprises a resilient trigger membrane arranged between the high pressure side and the low pressure side such that a position of the resilient trigger membrane is dependent on a pressure difference between the high pressure side and the low pressure side, wherein the state of the control chamber valve is determined by the position of the resilient trigger membrane such that the control chamber valve is in the open state when the pressure difference is above a threshold and in the closed state otherwise.

This mechanism provides an automatically triggered air pulse for cleaning an air filter, thus avoiding the need for an operator to manually trigger filter cleaning. The mechanism is mechanical in nature, voiding the need for complicated control units and sensor arrangements, which is an advantage.

According to aspects, a lever is arranged pivotable about an axis and arranged to connect the resilient trigger membrane to the control chamber valve. This lever provides leverage which can be tuned to the force requirements of the application at hand, which is an advantage. The lever also distances the trigger membrane from the control chamber, thereby simplifying functional layout of the design an providing a valve arrangement with reduced footprint, which is an advantage.

According to aspects, the valve arrangement further comprises a calibration device configured to determine the threshold by biasing the lever to resist pivoting about the axis. This calibration device can be used in-field to adjust the automatic triggering function of the valve arrangement.

According to aspects, the lever is operable by a manual control device to force the control chamber valve into the open state. Thus, the automatic triggering function can be overridden in a convenient manner.

According to aspects, the control chamber valve and the resilient trigger membrane are integrally formed. This further reduces footprint and provides a compact design, which is an advantage.

There are also disclosed herein pre-separators and dust extractors associated with the above-mentioned advantages.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method or process disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

The present disclosure will now be described in more detail with reference to the appended drawings, where

FIGS. 2A-C schematically illustrate a hatch mechanism;

DETAILED DESCRIPTION

Figure 1A:
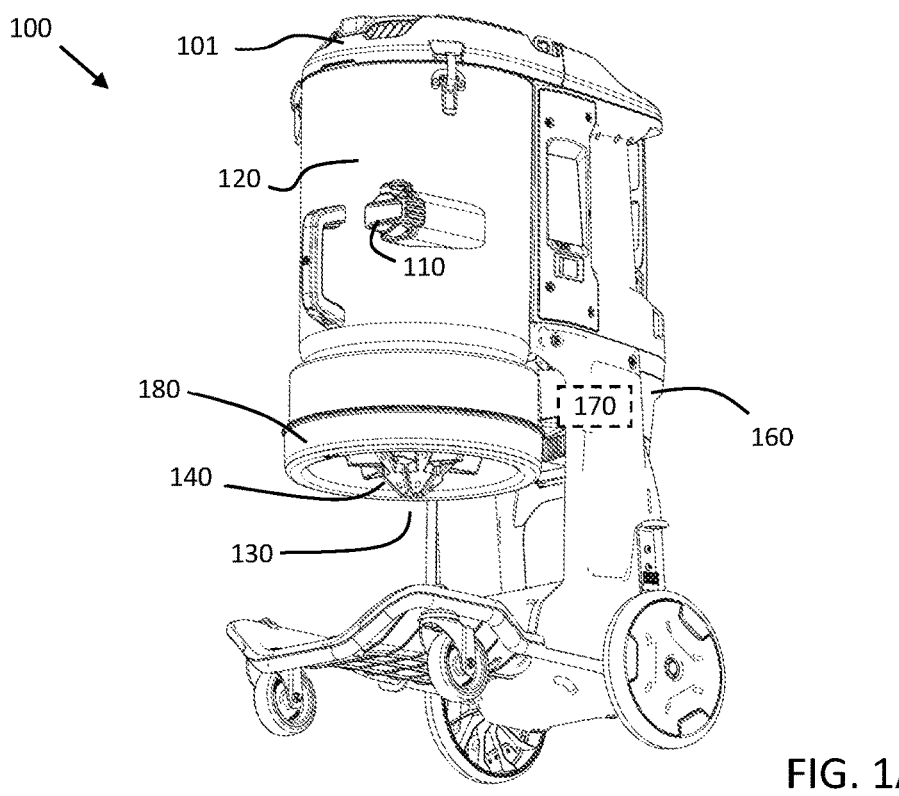
FIGS. 1A-B show an example dust extractor.

The invention will now be described more fully hereinafter with reference to the accompanying drawings, in which certain aspects of the invention are shown. This invention may, however, be embodied in many different forms and should not be construed as limited to the embodiments and aspects set forth herein; rather, these embodiments are provided by way of example so that this disclosure will be thorough and complete, and will fully convey the scope of the invention to those skilled in the art. Like numbers refer to like elements throughout the description.

It is to be understood that the present invention is not limited to the embodiments described herein and illustrated in the drawings; rather, the skilled person will recognize that many changes and modifications may be made within the scope of the appended claims. In particular, the different valve arrangements discussed herein may be used with a wide variety of different types of dust extractors, not only the dust extractor designs used as examples.

Figure 1B:
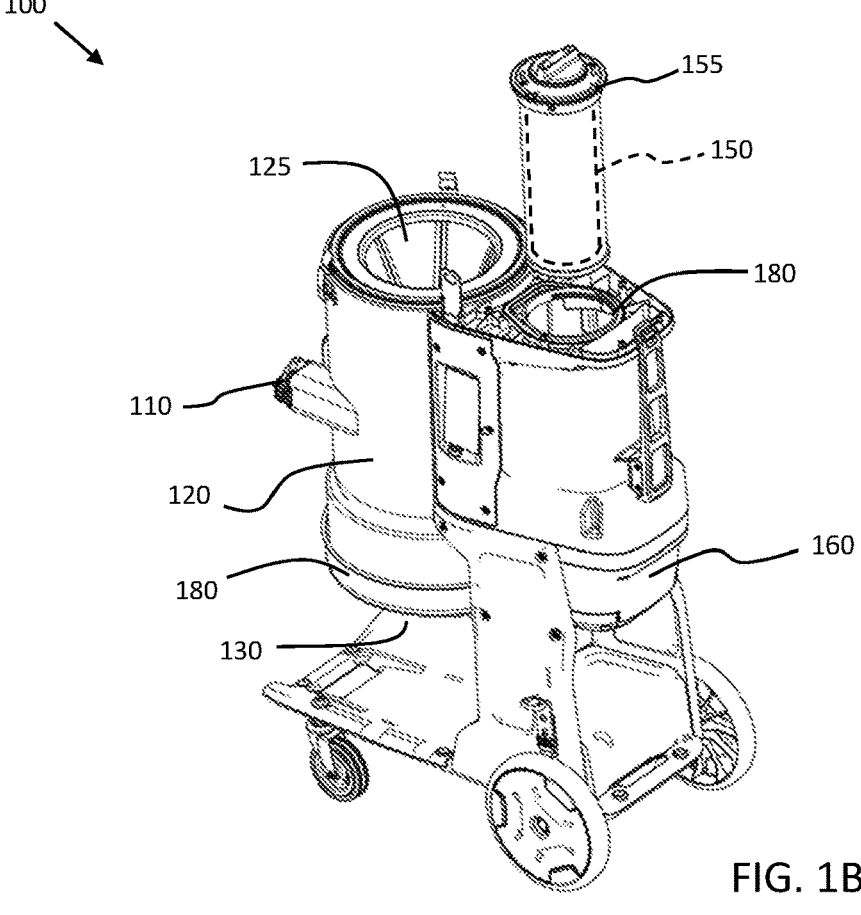

FIGS. 1A and 1B show an example dust extraction device 100. The dust extraction device can be connected via a hose to a dust generator (not shown in FIG. 1), such as a core drill, a floor grinder, a concrete saw, or the like. The dust and slurry from the dust generator enters the dust extractor via an inlet 110. A pre-separator 120 is arranged after the inlet, i.e., downstream with respect to the airflow direction into the inlet 110. The pre-separator may comprise a cyclone with a pre-filter for separating out larger debris particles from the particle-laden airflow entering the inlet 110. The larger debris particles may be collected via an outlet 130 of the pre-separator 120. A hatch mechanism 140 is arranged to close the outlet 130 during operation. FIG. 1A also shows a dust extractor lid 101 which forms an upper portion of the dust extractor 100. The lid 101 is not shown in FIG. 1B.

The pre-separator 120 may also be referred to as a cyclone, a cyclone tank, or a filter tank. As noted above, the hatch mechanisms discussed herein are applicable with most dust extractors for industrial use and need not be arranged to seal a pre-separator. Rather, the hatch mechanisms can be used to seal any filter tank structure.

The air flow continues from the pre-separator 120 via one or more conduits in the lid 101 into one or more essential filters 150, here shown inside a filter holder 155. An essential filter is a filter designed to meet strict requirements on filtering function. Such an essential filter 150 may, e.g., be a High-Efficiency Particulate Air (HEPA) filter, but other air filters may also be used.

A blower arrangement 160 is arranged downstream from the pre-separator 120 and from the one or more essential filters 150. The blower arrangement generates a suction force or vacuum which draws the particle-laden airflow in through the inlet 110, past the pre-separator 120, and through the one or more essential filters 150. Herein, a vacuum or vacuum level indicates how far below a reference pressure level, such as atmospheric pressure, the pressure in the airflow is.

The dust extractor 100 may also comprise a control unit 170 configured to perform various control actions, such as monitoring pressure levels at various places in the dust extractor 100 and controlling the blower arrangement 160.

The hatch mechanism 140 is an important part of the dust extractor 100. This hatch is used when emptying the pre-separator chamber into a dust container which is arranged below the hatch (but not shown in FIGS. 1A-B). The dust container may, e.g., be a removable box structure or a plastic bag, such as the Longopac® bagging system mentioned above. If the hatch mechanism is used with a non-rigid plastic bag dust container system, it is important that the dust bag is not sucked into the pre-separator chamber via the hatch. However, this does not mean that the hatch needs to be air-tight during operation.

The present disclosure relates to hatch mechanisms which close to prevent the dust container from being sucked into the pre-separator during operation, while at the same time allowing for easy emptying of dust into the dust container. The hatch mechanisms are designed so as to not damage a plastic bag dust container.

Figure 2A:
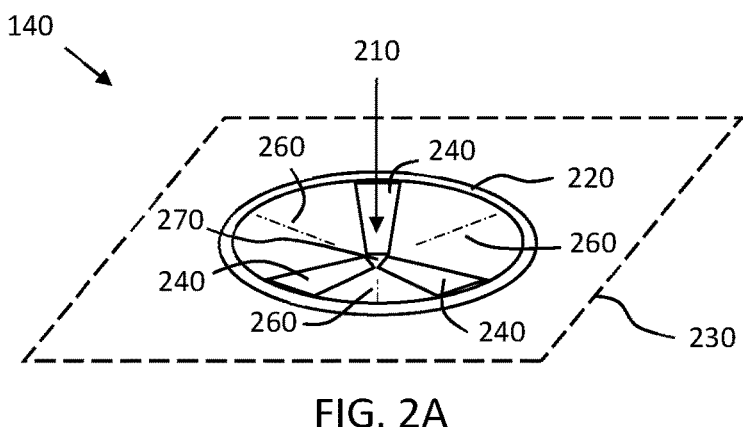

FIGS. 2A-C schematically illustrate a hatch mechanism according to the present disclosure. The hatch mechanisms 140 discussed herein are generally suitable for use with pre-separators 120, such as the pre-separator exemplified in FIGS. 1A and 1B.

The mechanism comprises an aperture 210 having a perimeter 220 arranged in a plane 230. It is via this aperture that the accumulated dust and slurry is dumped into the dust container below the hatch mechanism. To empty the pre-separator chamber, the low operating pressure inside the chamber is first increased, e.g., by opening a conduit to outside atmosphere as during filter cleaning, or by turning off the blower arrangement 160. The plane 230 can be defined freely to be some plane having the main emptying direction of the hatch as its normal. It is appreciated that the perimeter need not be perfectly aligned with the plane along the entire circumference.

At least three elongated obturator elements 240 are pivotably attached 250 along the perimeter 220 at respective hinge ends 241. Each obturator element comprises a distal end 242 arranged opposite to the hinge end along the extension direction of the obturator element 240. This means that each obturator element is connected to the perimeter 220 in a way such that it can swing inwards with respect to the aperture.

Figure 3:
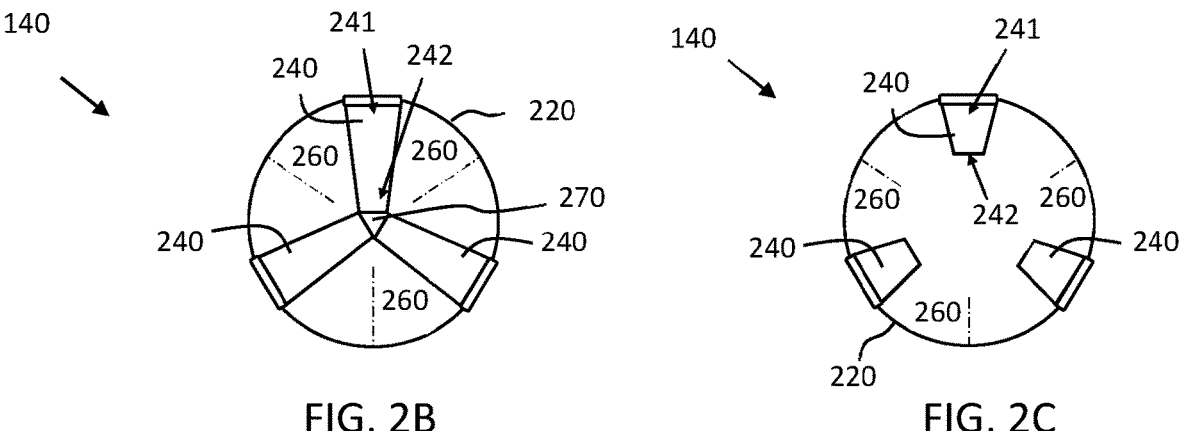
FIG. 3 schematically illustrates a hatch mechanism in closed position.
Figure 3:
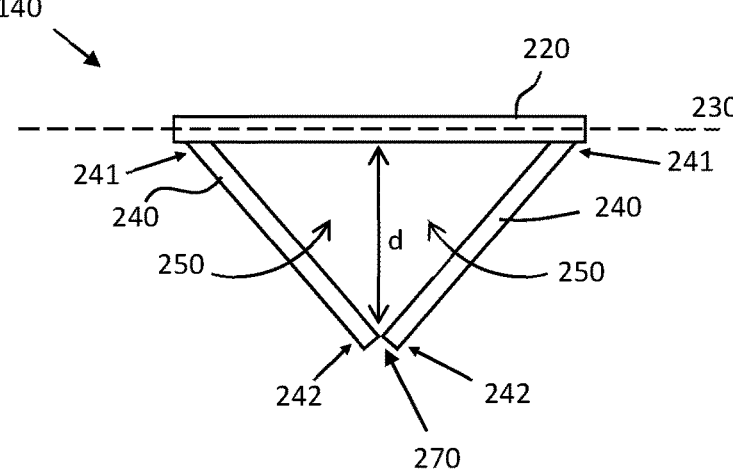

FIG. 3 shows an example hatch mechanism 140 in closed position where the pivoting motion 250 by the obturator elements 240 has been indicated. Adjacent obturator elements 240 arranged along the perimeter 220 are connected by foldable joining members 260 arranged to guide the distal ends 242 to a common intersection point 270 distanced d from the plane 230, whereby the obturator elements 240 are arranged to fold about respective hinge ends 241 to a position of mutual support to close the hatch mechanism 140. Thus, the obturator elements swing inwards to a position of mutual support, forming an upside-down cone- or pyramid-like structure where the distal ends meet at the pointy end. An obturator element 240 may, e.g., be realized by a rigid or semi-rigid batten structure, such as a metal bar structure or an elongated plastic structure.

When this structure is subject to a pressure gradient over the aperture, the obturator elements 240 and foldable joining members 260 will be sucked towards the pre-separator chamber, i.e., in direction of the aperture 210. This will cause the obturator elements 240 to pivot as illustrated in FIG. 3 which closes the hatch, at least sufficiently in order for a dust container bag to not get sucked into the pre-separator chamber. When the low pressure in the pre-separator chamber is released, the obturator elements 240 will no longer be held in closed position, but will swing radially outwards, thereby opening the hatch. According to some aspects the obturator elements 240 are configured with an increased weight in order to promote opening of the hatch by gravitational force.

This hatch mechanism is not rigid like other known hatch mechanism based on metal lids and the like. Rather, the hatch can be integrally formed in a resilient material which moves and/or vibrates during operation, such as during smaller pressure differences over time in the pre-separator main chamber. This motion by the hatch mechanism prevents dust and slurry from forming more solid lumps which are difficult to empty. Also, the hatch mechanism may even allow dust and slurry to penetrate the hatch mechanism despite a pressure gradient over the aperture when the accumulated dust obtains sufficient weight to overcome the suction force which closes the hatch. This means that the hatch mechanisms disclosed herein may automatically open as needed to dump dust and slurry into the dust container below the hatch. This automatic opening may, e.g., take place when the air filter 125 is cleaned by a reverse thrust of air.

Figure 4A:
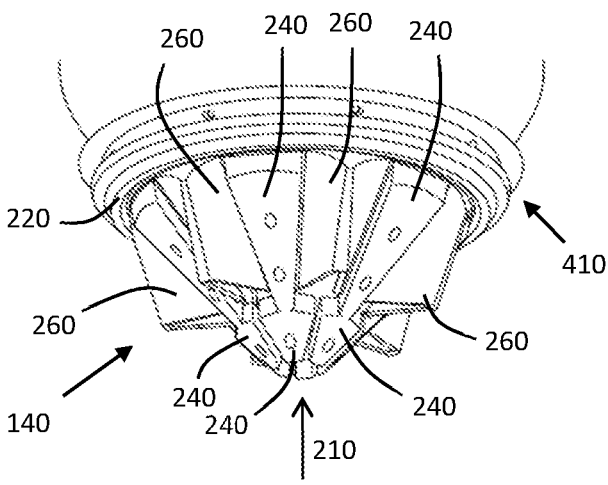
FIGS. 4A-C illustrate an example hatch mechanism in closed position.
Figure 4B:
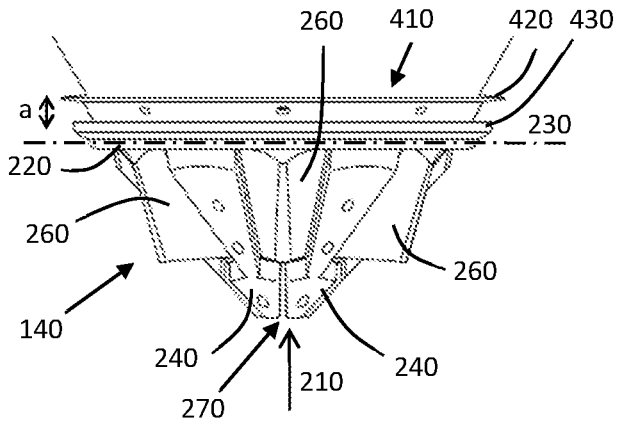
Figure 4C:
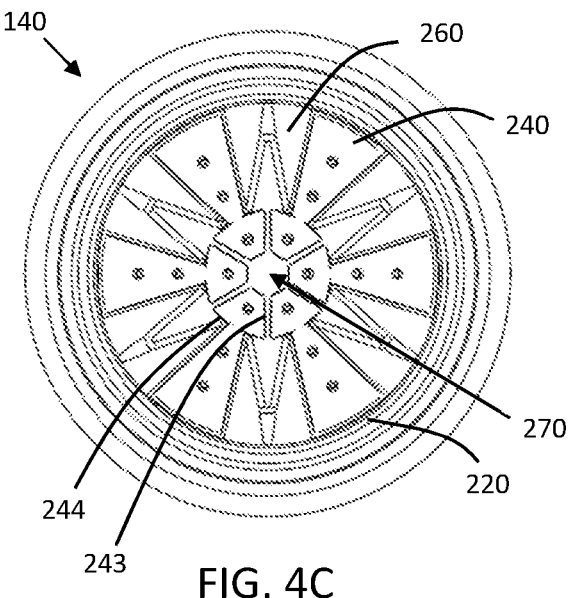

FIGS. 4A-C illustrate an example hatch mechanism in closed position.

Figure 5A:
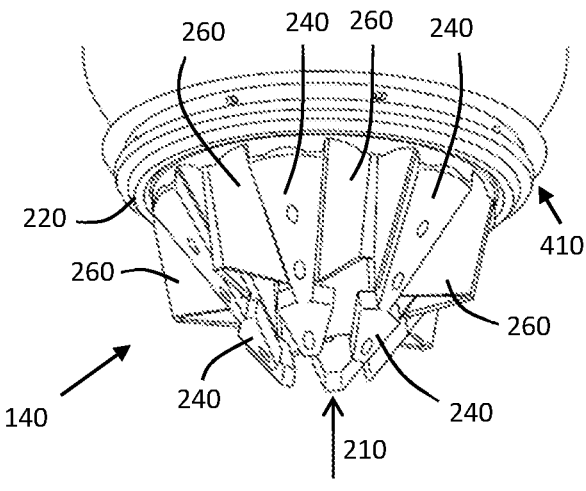
FIGS. 5A-C illustrate an example hatch mechanism in open position.
Figure 5B:
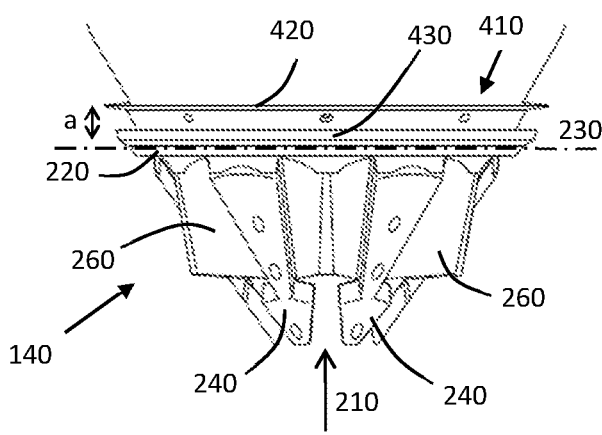
Figure 5C:
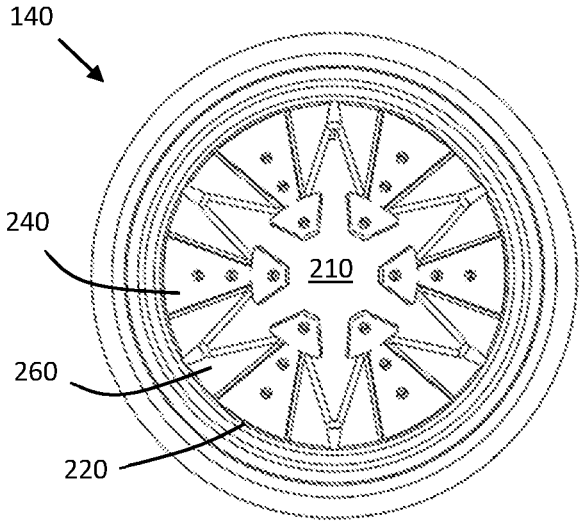

FIGS. 5A-C illustrate the same example hatch mechanism in open position.

In this example the aperture 210 has a circular shape and the common intersection point 270 is located at the center of the aperture. However, other shapes are also possible. For instance, an elliptical aperture shape could be used, where the obturator members 240 are of different length in order to fold about the respective hinge ends 241 to a position of mutual support to close the hatch mechanism 140.

According to some other aspects, the aperture 210 has a polygonal shape with number of equal sized faces equal to the number of obturator elements 240.

The common intersection point 270 can be located anywhere in the aperture, e.g., offset to one side, as long as the common intersection point 270 is distanced d from the plane 230. The obturator elements 240 are then matched to meet at the common intersection point when pivoting about the hinge ends 241.

In the example shown in FIGS. 4A-C and 5A-C, six obturator elements 240 are arranged evenly spaced along the perimeter 220 of the aperture 210. The obturator elements 240 are pivotably attached via a resilient portion at the hinge end 241 of each obturator element 240, i.e., a rubber or soft plastic part separating the obturator member from the perimeter to allow pivoting by the obturator member. Each obturator element is configured with a distal end 242 with a polygon shape matched to adjacent obturator elements. In this case the polygon shape has two opposing tangential sides 243 arranged at an acute angle of about 60 degrees in order to interface with adjacent obturator elements, and two radial sides 244 as indicated in FIG. 4C.

According to another example, the obturator elements 240 are pivotably attached via a hinge at the hinge end 241 of each obturator element 240. This hinge may, e.g., be a piano hinge or the like.

The foldable joining members 260 are preferably but not necessarily made of a flexible sheet material. As an alternative to using a flexible sheet material like rubber, hinges can also be used to allow folding. The important feature here is that the folding members guide to obturator elements to the position of mutual support during pivoting about the respective hinge ends.

In the example shown in FIGS. 4A-C and 5A-C, the foldable joining members 260 are arranged with a folding indication configured extending along a line from a point on the perimeter halfway between the adjacent obturator elements towards a geometric center of the aperture 210. Preferably, the foldable joining members 260 are integrally formed as a tubular element in a resilient material, such as rubber, i.e., a flexible structure resembling a hose or other resilient cylindrical structure, to which tubular element the obturator elements 240 are attached. The obturator elements 240 can also be molded into or otherwise integrally formed with the tubular structure. It may as mentioned above be advantageous to arrange the obturator elements with a relatively large weight, where the weight is configured in dependence of the power of the dust extractor, in order to promote opening of the hatch mechanism during emptying of dust and slurry into the dust container.

Figure 6:
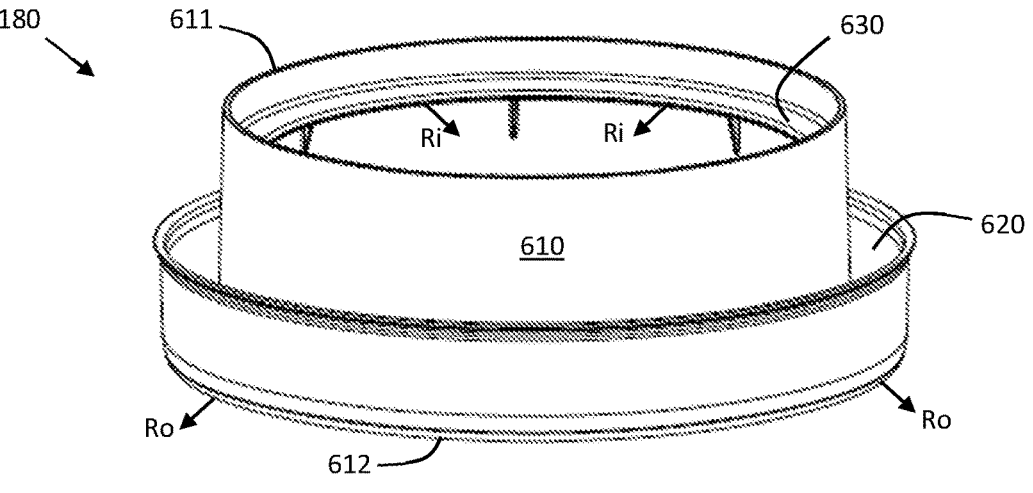
FIG. 6 illustrates an example dust container holder arrangement.

With reference again to FIGS. 1A and 1B, some dust extractors 100 comprise dust container holder arrangements 180. FIG. 6 illustrates an example of such a dust container holder arrangement 180. Some of the hatch mechanisms 140 disclosed herein are configured to hold a dust container arrangement. According to such aspects, with reference to, e.g., FIGS. 4B and 5B, the perimeter 220 of the hatch mechanism 140 comprises a rim portion 410 with first 420 and second 430 flanges extending radially outwards from the rim portion with an axial separation a.

With reference also to FIG. 6, the first flange 420 and the second flange 430 are configured to mate with a flange portion 630 on the dust container holder 180 which extends radially inwards Ri to mate with the first and second flanges on the hatch mechanism.

The dust container holder 180 comprises a tubular body 610 extending between first 611 and second 612 end perimeters. The flange portion 630 extends radially inwards Ri in connection to the first end perimeter 611. A groove portion 620 extends radially outwards Ro in connection to the second end perimeter. This groove portion 620 is configured to hold a dust container 810, such as the Longopac® bagging system.

Figure 7A:
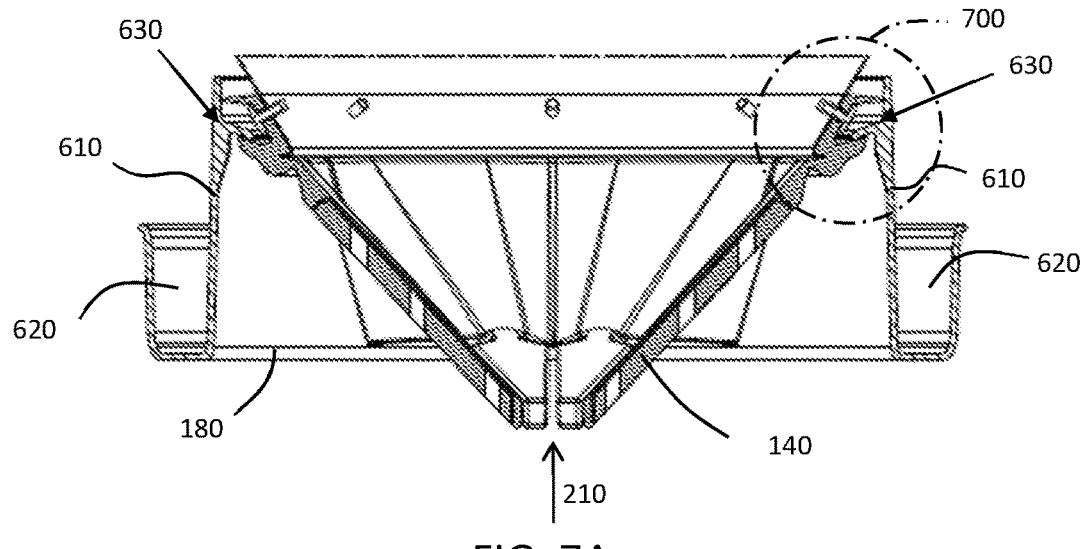
FIG. 7A-B shows a dust container holder attached to a hatch mechanism.
Figure 7B:
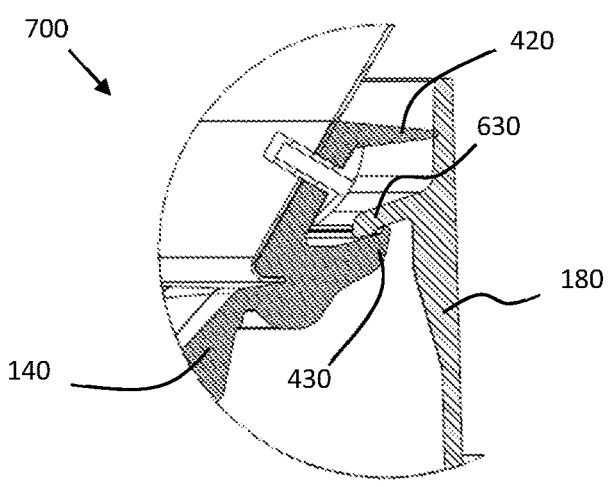

FIG. 7A-B shows a dust container holder 180 attached to a hatch mechanism 140 by these radial flanges.

Figure 8:
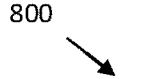
FIG. 8 schematically illustrates a dust container holder arrangement.

FIG. 8 schematically illustrates a dust container assembly 800 comprising a dust container holder arrangement according to the present teaching fitted onto a hatch mechanism. Note how the dust container 810 is crimped 820 and fitted into the groove portion 620, with an end section 840 that is squeezed between the first flange 420 and the second flange 430 of the hatch mechanism 140, and the flange 630 of the dust container holder 180. The dust container is sealed by a sealing member 830, such as a zip-tie, a cable-tie, a piece of string, or the like.

The dust container holder 180 is arranged to be fitted onto the hatch mechanism 140 by pushing the first end perimeter 611 over the hatch mechanism, wherein the flange portion 630 is configured to hold the dust container 810 in position between the flange portion and the hatch mechanism 140. This way the dust container can be easily fitted onto the dust extractor. The dust container is held in position between the flanges, which voids the need for additional fastening means to hold the dust container in position.

Figure 9A:
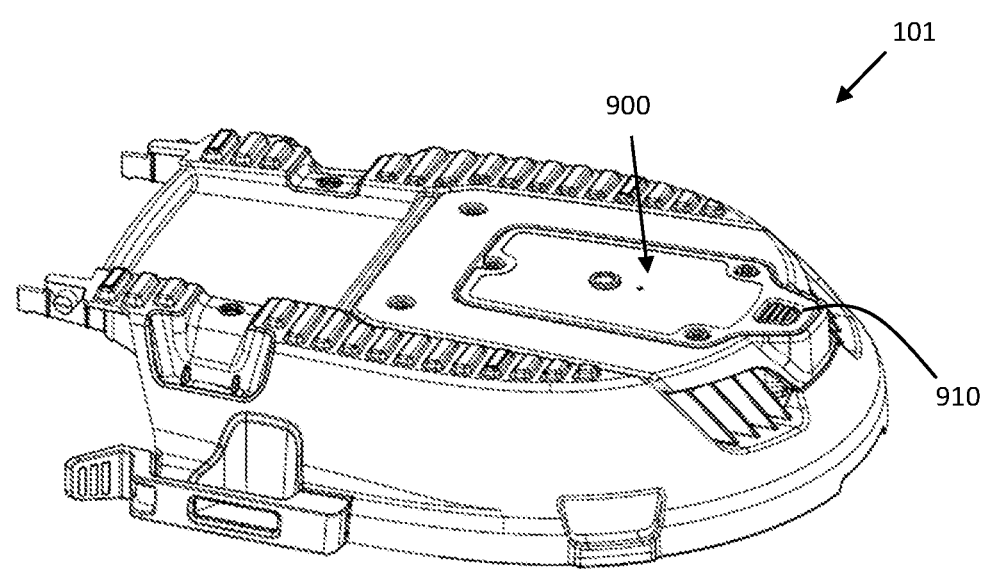
FIGS. 9A-B illustrates an example dust extractor lid portion.

FIG. 9A illustrates an example dust extractor lid portion 101. This lid portion 101 comprises an example valve arrangement 900 for generating pulses of air to clean an air filter in the pre-separator 120. It is appreciated that the principles of the valve arrangements discussed herein are applicable in a wide variety of applications, and not limited to mounting in the exact manner illustrated by the drawings.

The valve arrangements 900 discussed herein are configured for automatically generating an air pulse to clean the pre-separator air filter when needed, i.e., when the air filter is starting to become too particle laden for efficient dust extraction operation.

Some of the valve arrangements are also possible to operate manually, overriding the automatic function. Towards this end, a manual control device 910, such as a button or a knob, is arranged on the lid 101.

Figure 9B:
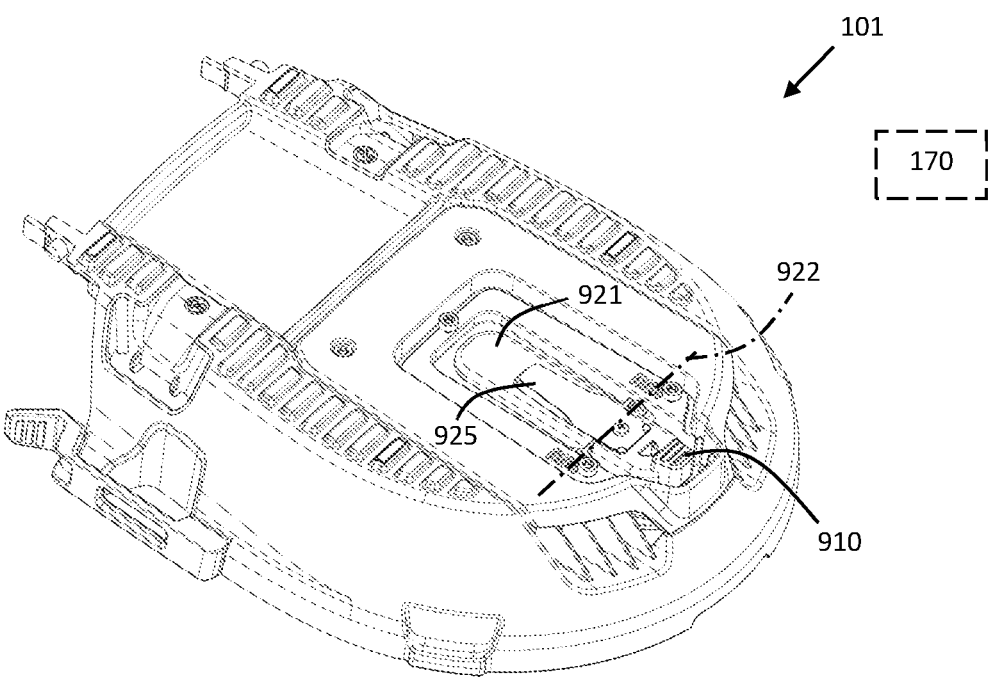
Figure 10A:
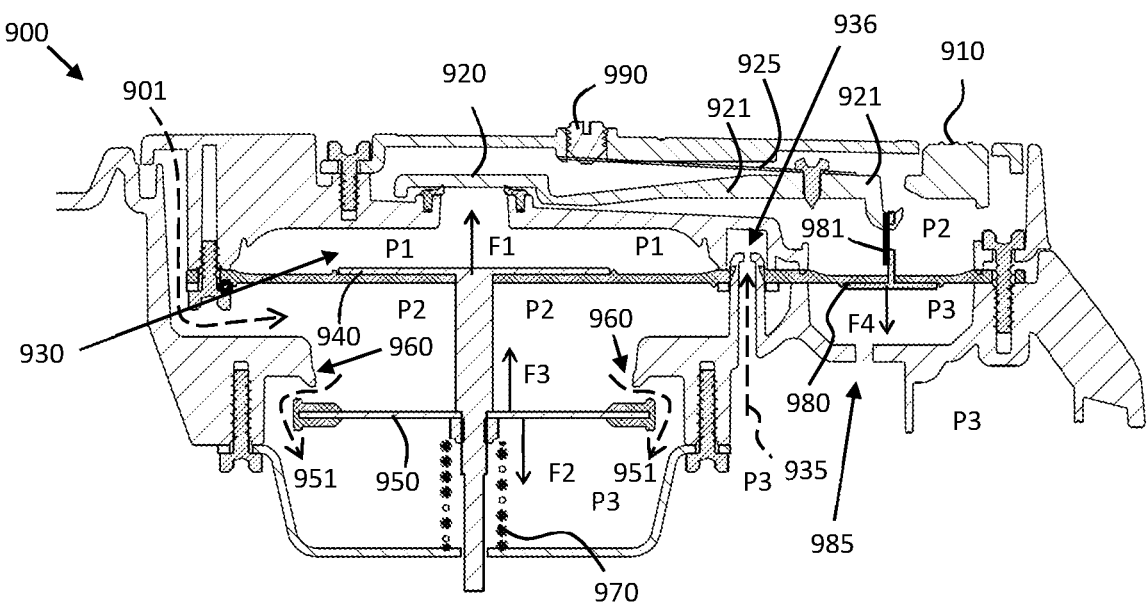
FIGS. 10A-C show example valve arrangements for generating pulses of air.
Figure 10B:
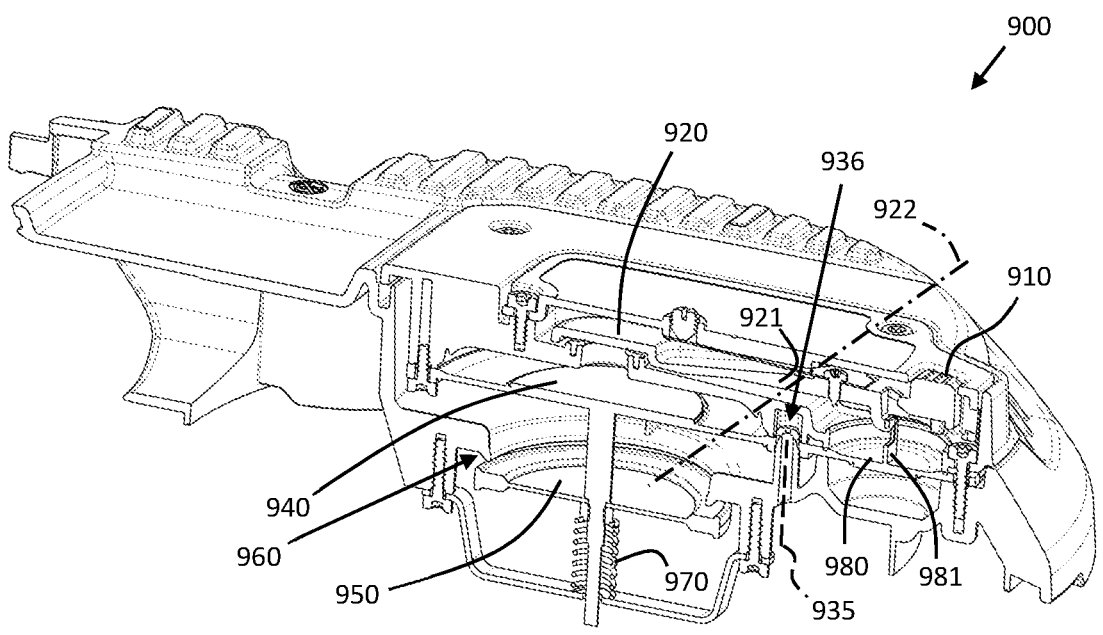
Figure 10C:
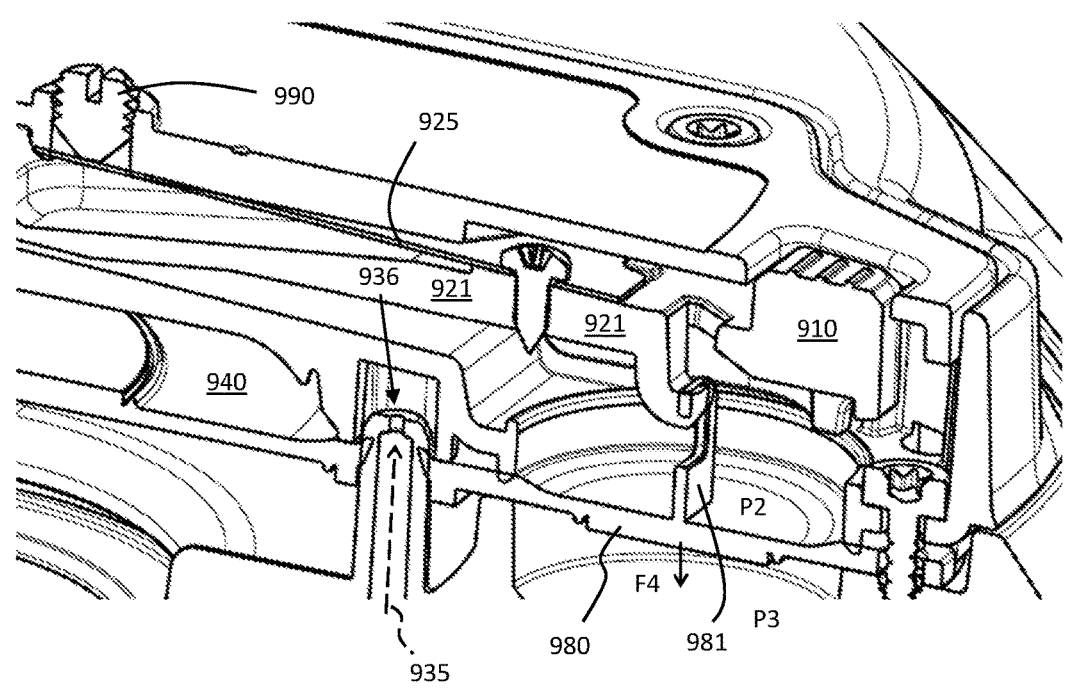

FIG. 9B illustrates details of the valve arrangement 900 which will be discussed in more detail below. FIGS. 10A-C show example valve arrangements 900 for generating a pulse of air to clean an air filter 125 of a pre-separator 120. The arrangement 900 comprises a main valve closure body 950 arranged to seal a passage 951 between a high pressure P2 side and a low pressure P3 side of the valve arrangement 900. The high pressure side may, e.g., be connected via fluid conduit 901 to atmospheric pressure, while the low pressure side may be associated with a machine operating pressure, i.e., be connected to a point in the dust extraction flow upstream from the air filter 125.

The valve arrangement 900 also comprises a control body 940 connected to the main valve closure body 950, such that a position of the main valve closure body 950 is determined by a position of the control body 940. In other words, if the control body 940 moves, so does the main valve closure body 950. Note that this motion is longitudinal or normal with respect to a plane of the main valve closure body 950 in FIG. 10A, but this exact configuration is not a necessary feature. The position of the main valve closure body 950 can be determined by the position of the control body 940 is many different ways, e.g., via a lever arrangement, via wire, or by some other form of mechanical linkage.

The control chamber 930 is partially defined by the control body 940. In the example of FIGS. 10A-B, the control chamber is a space which is sealed by a resilient membrane which is able to move up and down to restrict or expand the volume of the control chamber. The volume of the control chamber 930 is therefore variable in relation to the position of the control body 940. Other ways to implement this type of control chamber would, e.g., comprise a cylinder and piston arrangement, or a balloon arrangement. If pressure P1 inside the control chamber 930 is smaller than pressure P2 outside the control chamber, the control body 940 will move due to force F1 to restrict the volume in the control chamber 930. This motion also pulls the main valve control body 950 into sealing position. Another force F2 acts on the main valve control body 950 due to a pressure difference between the low pressure P3 side and the high pressure P2 side.

A control chamber valve 920 having an open state and a closed state for regulating the pressure P1 in the control chamber is furthermore comprised in the valve arrangement 900. When this valve is opened to increase pressure in the control chamber, e.g., from a machine operating pressure to atmospheric pressure, the main valve control body is shifted into a non-sealing position. The effective area of the control body 940 may be arranged larger than an effective area of the main valve control body 950.

This general type of control chamber mechanism for opening and closing a main valve closure body 950 has been proposed previously, see, e.g., WO 2017/025305 and EP3619453 A1. Its basic mechanisms and principles of operation will therefore not be discussed in more detail herein, although an example will be discussed in connection to FIGS. 11A-C below.

Differently from the known valve arrangements, this valve arrangement may be automatically triggered when the air filter becomes particle laden and is in need of cleaning, or when the operator blocks the inlet 110. Towards this end, the valve arrangement 900 optionally comprises a resilient trigger membrane 980 arranged between the high pressure P2 side and the low pressure P3 side such that a position of the resilient trigger membrane 980 is dependent on a pressure difference between the high pressure P2 side and the low pressure P3 side. The state of the control chamber valve 920 in the valve arrangement 900 is arranged to be determined by the position of the resilient trigger membrane 980 such that the control chamber valve 920 is in the open state when the pressure difference is above a threshold and in the closed state otherwise.

Figure 10D:
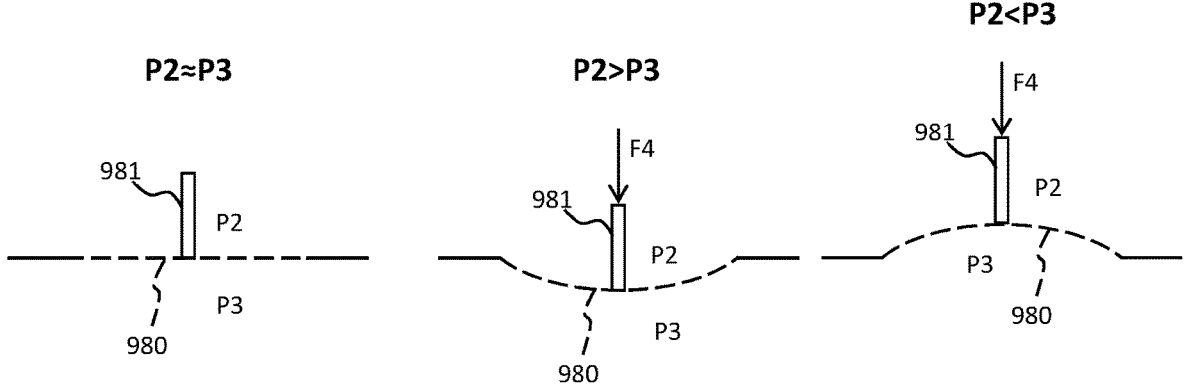
FIG. 10D schematically illustrates a principle of a triggering membrane.

Since the membrane is resilient, it will flex and be drawn towards the side of the membrane with lowest pressure, as illustrated in FIG. 10D. Thus, a connecting member 981 attached to the membrane will move in dependence of the pressure difference on either side of the membrane 980.

The valve arrangement 900 illustrated in FIGS. 10A-C also differ from the known valve arrangements in how the pressure P1 in the control chamber 930 is regulated to trigger the air pulse for cleaning the air filter. The valve arrangement 900 comprises a connecting channel 935 which fluidly connects the control chamber 930 to the low pressure P3 side. The connecting channel 935 is a relatively narrow conduit which extends from the low pressure P3 side into the control chamber 930 (the connecting channel aperture 936 opens up into the control chamber 930 as can be inferred from, e.g., FIG. 10A).

Thus, air is constantly drawn out from the control chamber 930 towards the low pressure P3 side via the connecting channel 935 when the dust extractor is in use. A low pressure is thereby generated in the control chamber 930 as long as the control chamber valve 920 is in the closed state. The control chamber valve 920 is configured with an aperture that is larger than the aperture 936 of the connecting channel 935, which means that the control chamber valve is arranged to overcome the connecting channel aperture 936 when in the open state. In this context, "to overcome" means that the pressure inside the control chamber increases if the control chamber valve 920 is open despite that the connecting channel 935 constantly connects the control chamber to the low pressure P3 side. It is noted that the connecting channel 935 is not closed when the air pulse is triggered, which means that no complex three-way valve or the like is required as in WO 2017/025305.

For example, the diameter of the aperture of the control chamber valve 920 may be on the order of 15 mm for a circular aperture, which means that the area is about 175 mm². This large aperture easily overcomes an aperture of the connecting channel 936 which may be on the order of about 1.6 mm in diameter for a circular aperture corresponding to an area of about 2 mm².

It is appreciated that the apertures of the control chamber valve 920 and the connecting channel 936 need not be circular, or even regular in shape. It is the aperture area which is important in order for the control chamber valve 920 to be able to overcome the connecting channel 936. An aperture of the control chamber valve 920 which is about two times larger in area may be sufficient, although a larger difference may be preferred, such as ten times larger or more. The larger the difference in aperture is, the faster the response is to the trigger. However, a too large control chamber valve aperture may result in structural difficulties.

When the control chamber valve 920 enters the open state the pressure in the control chamber rapidly increases due to the open connection to atmospheric pressure, i.e., the pressure inside the control chamber quickly goes from a machine operating pressure to atmospheric pressure. The effect of the connecting channel in reducing pressure is overcome, and the main valve control body is therefore shifted into a non-sealing position whereby the air pulse is generated to clean the filter.

The mechanism may be automatically triggered using the trigger membrane 980 when the air filter becomes particle laden and is in need of cleaning as discussed above, or it can be manually triggered by, e.g., the manual control device 910. The mechanism can also be triggered by an electrically actuated control device, such as a solenoid, arranged to force the control chamber valve 920 into the open state in response to a wired or wireless control signal. Thus, the mechanism can be electrically triggered by the control unit 170, or even remotely triggered via radio signal from a remote control device.

It is appreciated that the mechanism comprising the control chamber valve 920 arranged with an aperture larger than an aperture of the connecting channel can be used independently of whether the valve arrangement comprises the automatic triggering device or not. I.e., the arrangement can also be used with the manual control device 910 as the only means for triggering the air pulse.

To summarize, with reference to FIGS. 10A-C, there is disclosed herein a valve arrangement 900 for generating a pulse of air 1100 to clean an air filter 125 of a pre-separator 120. The arrangement 900 comprises a main valve closure body 950 arranged to seal a passage 951 between a high pressure P2 side and a low pressure P3 side of the valve arrangement 900, a control body 940, connected to the main valve closure body 950, such that a position of the main valve closure body 950 is determined by a position of the control body 940, a control chamber 930, partially defined by the control body 940, whereby a volume of the control chamber 930 is variable in relation to the position of the control body 940, and a control chamber valve 920 having an open state and a closed state for regulating a pressure P1 in the control chamber. The control chamber 930 is fluidly connected to the low pressure P3 side via a connecting channel 935 configured with a connecting channel aperture 936, and the control chamber valve 920 is configured with an aperture larger than the connecting channel aperture 936 such that the control chamber valve 920 is arranged to overcome the connecting channel 935 when in the open state. The state of the control chamber valve 920 is determined by a trigger device 910, 980.

Some optional details of the valve arrangement 900 are illustrated in 10C. Here, with reference also to FIG. 10B, a lever 921 is arranged pivotable about an axis 922 and arranged to connect the resilient trigger membrane 980 to the control chamber valve 920. Thus, as the pressure difference P2-P3 increases, the resilient trigger membrane 980 is drawn towards the low-pressure side (pressure P3, downwards in FIG. 10C). This motion by the resilient trigger membrane 980 pulls the lever downwards via the connecting member 981. The downward pulling force F4, when strong enough, translates into a pivoting motion by the lever 921, causing the control chamber valve 920 to open abruptly.

An optional biasing member 925, here a leaf spring, is configured to resist this pivoting motion. This biasing member is part of an optional calibration device 925, 990. Thus, according to some aspects, the valve arrangement 900 further comprises a calibration device 925, 990 configured to determine the threshold by biasing the lever to resist pivoting about the axis 922. This calibration device may, e.g., be a resilient member like the leaf spring shown in FIGS. 10A and 10C with a tuning screw 990 to determine the biasing force. A helical spring or other resilient member can of course also be used for the same biasing effect.

The lever 921 is optionally arranged to be operable by a manual control device 910 to force the control chamber valve 920 into the open state. This manual control device 910 is exemplified by a push-button directly actuating the lever 921 in FIG. 10C. This manual control device then overrides the automatic triggering function to generate the pulse of air independently of the pressure difference P2-P3.

According to other aspects, the control chamber valve 920 and the resilient trigger membrane 980 are integrally formed. This means that the resilient trigger membrane 980 directly pulls the control chamber valve 920 into the open state as the pressure difference goes above the threshold, perhaps first overcoming a biasing force exerted by a resilient member configured to bias the control chamber valve 920 into the closed position.

With reference to FIG. 10B, the valve arrangement 900 optionally comprises a main valve biasing member 970 arranged to bias the main valve closure body 950 into sealing the passage 951. This main valve biasing member can be realized by a helical spring as shown in FIG. 10B.

Figures 11A, 11B:
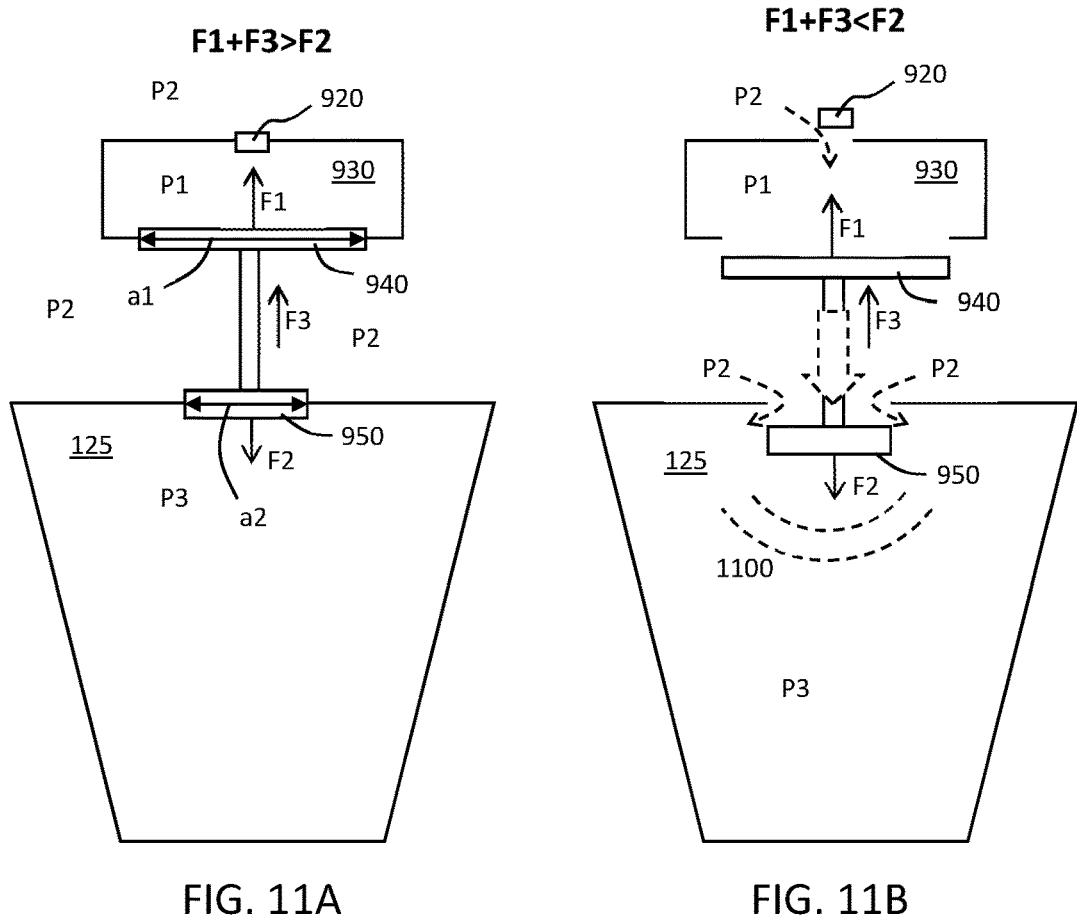
FIGS. 11A-C conceptually illustrate the generation of an air pulse.
Figure 11C:
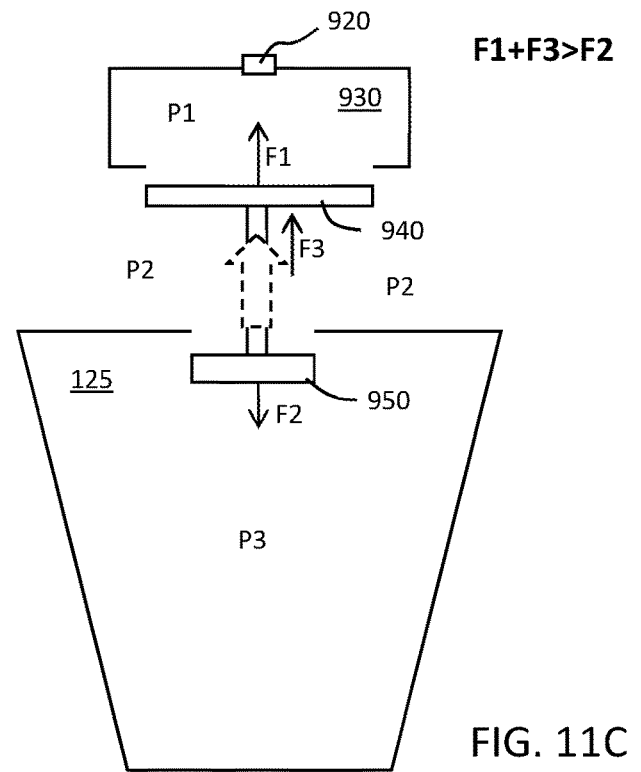

FIGS. 11A-C conceptually illustrate the generation of an air pulse by the valve arrangements disclosed herein. FIG. 11A illustrates an operation state where the control chamber valve 920 is in closed position, and a low pressure prevails in the control chamber. This low pressure in the control chamber may be obtained, e.g., by connecting the control chamber to the low-pressure side of the dust extractor 100. The main valve closure body 950 is in sealing position due to that the combination of force F1 generated by the control body 940 and the optional biasing force F3 generated, e.g., by the resilient element 970 overcomes the force F2 exerted on the main valve closure body 950 by the pressure difference between the high pressure P2 (normally atmospheric pressure) and the pressure P3 (the vacuum generated by the blower arrangement 160). Note that the effective area al of the control body 940 is larger than the effective area of the main valve closure body 950. This, for the same pressure difference, when P1=P3, the force F1 will be larger compared to force F2.

In FIG. 11B, the control chamber valve 920 is opened to increase pressure P1 inside the control chamber 930, e.g., to atmospheric pressure P1=P2. The force F1 therefore decreases such that the combination of F1 with F3 no longer overcomes the force F2. The main valve closure body 950 therefore abruptly leaves the sealing position, whereby air forcefully enters the pre-separator upstream from the air filter 125. This generates a pulse of air 1100 which pushes particles away from the exterior filter wall, thereby cleaning the air filter 125.

In FIG. 11C, the pressure P3 has been increased such that F2 is reduced. The combination of F1 and F3 now overcomes F2 to once more place the main valve closure body 950 in sealing position. This process can be repeated until the air filter 125 is not particle laden anymore.

The invention claimed is:

1. A dust extractor comprising a pre-separator and a valve arrangement configured to generate a pulse of air to clean an air filter of the pre-separator, the valve arrangement comprising:

a main valve closure body arranged to seal a passage between a high pressure side and a low pressure side of the valve arrangement, a control body, connected to the main valve closure body, such that a position of the main valve closure body is determined by a position of the control body, a control chamber, partially defined by the control body, whereby a volume of the control chamber is variable in relation to the position of the control body, and a control chamber valve having an open state and a closed state for regulating a pressure in the control chamber, wherein the control chamber is fluidly connected to the low pressure side via a connecting channel configured with a connecting channel aperture, wherein the control chamber valve is configured with an aperture larger than the connecting channel aperture such that the control chamber valve is arranged to overcome the connecting channel when in the open state, wherein a state of the control chamber valve is determined by a trigger device arranged to force the control chamber valve into the open state, and wherein the main valve closure body is biased into sealing the passage via a main valve biasing member.

2. The dust extractor according to claim 1, wherein the trigger device comprises a manual control device.

3. The dust extractor according to claim 1, wherein the trigger device comprises an electrically actuated control device arranged to force the control chamber valve into the open state in response to a wired or wireless control signal.

4. The dust extractor according to claim 1, wherein the trigger device comprises a resilient trigger membrane arranged between the high pressure side and the low pressure side such that a position of the resilient trigger membrane is dependent on a pressure difference between the high pressure side and the low pressure side, wherein the state of the control chamber valve is determined by the position of the resilient trigger membrane such that the control chamber valve is in the open state when the pressure difference is above a threshold and in the closed state otherwise.

5. The dust extractor according to claim 4, wherein the control chamber valve and the resilient trigger membrane are integrally formed, or wherein a lever arranged pivotable about an axis is arranged to connect the resilient trigger membrane to the control chamber valve.

6. The dust extractor according to claim 5, further comprising a calibration device configured to determine the threshold by biasing the lever to resist pivoting about the axis, or wherein the lever is operable by the manual control device to force the control chamber valve into the open state.

7. The dust extractor according to claim 1, wherein the low pressure side is associated with a pressure upstream from the air filter of the pre-separator, and wherein the high pressure side is associated with atmospheric pressure.

8. The dust extractor according to claim 1, wherein the control chamber valve is configured with an aperture area which is at least twice an aperture area of the connecting channel aperture.

9. The dust extractor according to claim 1, wherein the control chamber valve is configured with a circular aperture with a diameter between 10-20 mm, and wherein the connecting channel has a circular aperture with diameter between 1-3 mm.

10. A dust extractor comprising a pre-separator and a valve arrangement configured to generate a pulse a pulse of air to clean an air filter of the pre-separator, the valve arrangement comprising a main valve closure body arranged to seal a passage between a high pressure side and a low pressure side of the valve arrangement, a control body, connected to the main valve closure body, such that a position of the main valve closure body is determined by a position of the control body, a control chamber, partially defined by the control body, whereby a volume of the control chamber is variable in relation to the position of the control body, a control chamber valve having an open state and a closed state for regulating a pressure in the control chamber, and a trigger device arranged to force the control chamber valve into the open state, the trigger device comprising a resilient trigger membrane arranged between the high pressure side and the low pressure side such that a position of the resilient trigger membrane is dependent on a pressure difference between the high pressure side and the low pressure side, wherein a state of the control chamber valve is determined by the position of the resilient trigger membrane such that the control chamber valve is in the open state when the pressure difference is above a threshold and in the closed state otherwise, and wherein the main valve closure body is biased into sealing the passage via a main valve biasing member.

11. The dust extractor according to claim 10, wherein the trigger device comprises a manual control device.

12. The dust extractor according to claim 10, wherein the trigger device comprises an electrically actuated control device arranged to force the control chamber valve into the open state in response to a wired or wireless control signal.

13. The dust extractor according to claim 10, wherein the control chamber valve and the resilient trigger membrane are integrally formed, or wherein a lever arranged pivotable about an axis is arranged to connect the resilient trigger membrane to the control chamber valve.

14. The dust extractor according to claim 13, further comprising a calibration device configured to determine the threshold by biasing the lever to resist pivoting about the axis, or wherein the lever is operable by the manual control device to force the control chamber valve into the open state.

15. The dust extractor according to claim 10, wherein the low pressure side is associated with a pressure upstream from the air filter of the pre-separator, and wherein the high pressure side is associated with atmospheric pressure.

16. The dust extractor according to claim 10, wherein the control chamber valve is configured with an aperture area which is at least twice an aperture area of the connecting channel aperture.

17. The dust extractor according to claim 10, wherein the control chamber valve is configured with a circular aperture with a diameter between 10-20 mm, and wherein the connecting channel has a circular aperture with diameter between 1-3 mm.

\*   \*   \*   \*   \*